US005922399A

United States Patent [19]

Kobayashi

[11] Patent Number: 5,922,399

[45] Date of Patent: Jul. 13, 1999

[54] COATING LINE SYSTEM AND METHOD OF REPAIRING COATING DEFECT

[75] Inventor: Mikio Kobayashi, Mie, Japan

[73] Assignee: Honda Giken Kogyo Kabushiki Kaisha, Tokyo, Japan

[21] Appl. No.: 08/655,319

[22] Filed: May 24, 1996

[30] Foreign Application Priority Data

Sep. 19, 1995 [JP] Japan .................................... 7-239600

[51] Int. Cl.$^{6}$ ............................. B32B 35/00; B05B 15/12

[52] U.S. Cl. .......................... 427/140; 427/142; 118/670; 118/713; 118/64; 118/326

[58] Field of Search .................................... 427/140, 142; 118/670, 713, 326, 64

[56] References Cited

U.S. PATENT DOCUMENTS 4,960,611 10/1990 Fujisawa et al. ....................... 427/142

FOREIGN PATENT DOCUMENTS 0 566 958 10/1993 European Pat. Off. .
59-78157 12/1985 Japan .
4-256467 9/1992 Japan .
5-50006 3/1993 Japan .
7-171492 7/1995 Japan .
2 099 731 12/1982 United Kingdom .

*Primary Examiner*—Katherine A. Bareford
*Attorney, Agent, or Firm*—Merchant, Gould, Smith, Edell, Welter & Schmidt

[57] ABSTRACT

A coating line system has a main coating line including at least a main coating booth for coating a workpiece, and a coating repairing line branched from the main coating line downstream of an inspecting section for inspecting the coated workpiece for a coating defect thereof. The coating repairing line has a coating repairing booth for repairing a coating defect of the workpiece which is caused in the main coating line, and a drying furnace disposed downstream of the coating repairing booth along the coating repairing line, for drying the workpiece which has been repaired in the coating repairing booth.

3 Claims, 8 Drawing Sheets

COATING LINE SYSTEM AND METHOD OF REPAIRING COATING DEFECT

BACKGROUND OF THE INVENTION

1. Field of the Invention

The present invention relates to a coating line system for smoothly repairing a coating defect on a coated workpiece such as any of various coated components of an automobile, and a method of repairing a coating defect in such a coating line system.

2. Description of the Prior Art

When a coating defect is discovered on an automobile bumper in a bumper coating line during an inspection process, it has heretofore been customary to rub the defective coating surface with sandpaper or the like to remove the defective coating layer from the bumper, and then coat the ground bumper surface again in the bumper coating line. The conventional repairing process has been disadvantageous because both newly coated and recoated workpieces are present in the coating line, resulting in a low overall coating rate. Another problem is that since even those portions of bumpers which do not need to be coated again are recoated, the entire repairing process is tedious and time-consuming, and consumes a large amount of coating solution.

In many coating lines, a workpiece is coated in a coating booth and thereafter dried in a drying furnace down-stream of the coating booth. According to Japanese laid-open patent publication No. 5-50006, for example, a setting booth is located between a coating booth and a drying furnace. After a coated workpiece is dried with air in the setting booth, the coated workpiece is charged into the drying furnace in which it is baked and dried.

As disclosed in Japanese laid-open patent publication No. 5-50006, the coating booth has its interior space divided into a vertical array of compartments or chambers including a dynamic pressure chamber, a static pressure chamber, a coating chamber, and a trapping chamber that are arranged downwardly in the order named. Air is supplied from a supply duct connected to an upper wall of the coating booth into the dynamic pressure chamber, from which the air is introduced at a constant rate into the static pressure chamber through a punched metal sheet lying between the dynamic pressure chamber and the static pressure chamber. The air introduced into the static pressure chamber is then supplied to the coating chamber through a filter extending between the static pressure chamber and the coating chamber. The air flowing into the coating chamber is free of dust particles because dust particles are filtered out by the filter. While flowing in the coating chamber, the air collects a mist of unused coating solution which remains suspended in the coating chamber. The air with the collected mist of coating solution is then introduced into the trapping chamber in which the mist of coating solution is trapped by trapping water flowing in the trapping chamber.

The coating booth which is compartmented into the various chambers including the trapping chamber that has a circulatory passage for the trapping water is large in size and expensive to manufacture.

Japanese laid-open utility model publication No. 60-188995 discloses a drying furnace. The disclosed drying furnace has a workpiece conveyor extending in the longitudinal direction of a furnace housing for moving a carriage with a workpiece mounted thereon. Hot air supply ducts are disposed one on each side of the workpiece conveyor and positioned respectively in lower side positions in the furnace housing, and a hot air discharge duct is connected to an upper wall of the furnace housing. Hot air supplied from the hot air supply ducts is applied to dry coated surfaces of the workpiece on the carriage, and is then discharged from the hot air discharge duct.

When the workpiece moving in the furnace housing is brought to an emergency stop due to some trouble or the rate of operation of the conveyor is lowered, more hot air than is necessary is applied to the coated surfaces of the workpiece. At this time, the workpiece is heated to a temperature higher than a predetermined allowable temperature, and hence tends to be distorted, elongated, or otherwise damaged. Furthermore, it requires a large-scale system for supplying and discharging hot air to set the workpiece to the predetermined temperature within a short period of time.

There have been demands for a coating line system of relatively simple structure which is capable of easily and efficiently repairing coating defects on coated workpieces, and a method of repairing a coating defect in such a coating line system.

SUMMARY OF THE INVENTION

It is therefore an object of the present invention to provide a coating line system of relatively simple structure for easily and efficiently repairing coating defects of coated workpieces while saving resources and energy required to coat workpieces, and a method of repairing a coating defect of a coated workpiece in such a coating line system.

According to the present invention, there is provided a coating line system comprising a main coating line including at least a main coating booth for coating a workpiece, and a coating repairing line branched from the main coating line, the coating repairing line having coating repairing means for repairing a coating defect of the workpiece which is caused in the main coating line, and drying means disposed downstream of the coating repairing means along the coating repairing line, for drying the workpiece which has been repaired by the coating repairing means.

The coating repairing means comprises a coating repairing booth for recoating a localized coating defect surface of the workpiece, and the drying means comprises a storage booth for storing a predetermined number of workpieces recoated in the coating repairing booth, and a drying furnace for drying the predetermined number of workpieces delivered from the storage booth. The coating repairing booth has a workpiece feed path for delivering the workpiece therealong, and the coating line system further comprises an air discharge chamber connected to the coating repairing booth laterally of the workpiece feed path, the main coating booth having a trapping chamber communicating with the air discharge chamber. With this arrangement, the workpiece can be dried with hot air and the hot air can be discharged with high energy efficiency.

Preferably, the drying furnace has a pair of spaced side walls, and the coating line system further comprises a hot air supply duct connected to a lower portion of one of the side walls and a hot air discharge duct connected to an upper portion of the other of the side walls. This arrangement allows the temperature to rise in a relatively short period of time within the drying furnace.

The coating repairing booth comprises an upper wall and a side wall connected thereto, the upper wall having an opening defined therein, an air inlet duct connected to the opening in the upper wall for introducing air into the coating repairing booth through the opening, an air direction adjusting member disposed in the coating repairing booth and connected to the opening for distributing air into the coating repairing booth, a filter disposed in the coating repairing booth for dividing an interior space thereof into an upper air direction adjusting chamber housing the air direction adjusting member and a lower coating chamber disposed below the upper air direction adjusting chamber for recoating a localized coating defect surface of the workpiece, air direction adjusting means disposed on an upper surface of the filter, and an air discharge port defined in the side wall for discharging air from the lower coating chamber. Preferably, the air direction adjusting means comprises a plurality of air direction adjusting slats disposed on the upper surface of the filter and extending along a workpiece feed path in the lower coating chamber, the air direction adjusting slats being slanted such that the air direction adjusting slat farthest from the air discharge port is directed substantially vertically and the other air direction adjusting slats are slanted through progressively greater angles toward the air discharge port to cause those air direction adjusting slats which are positioned closer to the air discharge port to direct air streams farther away from the air discharge port. Air can flow at an appropriate uniform speed in the coating repairing booth.

The main coating line further comprises a first inspecting section for inspecting a coated condition of the workpiece after the workpiece is coated in the main coating booth to determine whether the workpiece is accepted for being delivered to a next step in the main coating line, rejected, or needs to be polished, a polishing section for polishing the workpiece if the workpiece is judged as needing to be polished by the first inspecting section, and a second inspecting section for inspecting a polished condition of the workpiece from the polishing section to determine whether the workpiece is accepted for being delivered to the next step or rejected. The coating repairing means comprises a spot coating section for recoating a coating defect spot on the workpiece if the workpiece is judged as being rejected by the second inspecting section. The main coating line includes a main line drying furnace for drying the workpiece, and the drying means comprises a spot drying furnace communicating with the main line drying furnace for drying the workpiece with heat supplied from the main line drying furnace.

According to the present invention, there is further provided a method of repairing a coating defect of a workpiece, comprising the steps of coating a workpiece in a main coating line, delivering the workpiece from the main coating line to a coating repairing line branched from the main coating line if the workpiece coated in the main coating line has a coating defect, and repairing the coating defect of the workpiece in the coating repairing line. The step of repairing the coating defect comprises the step of recoating the coating detect in a spot on the workpiece.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
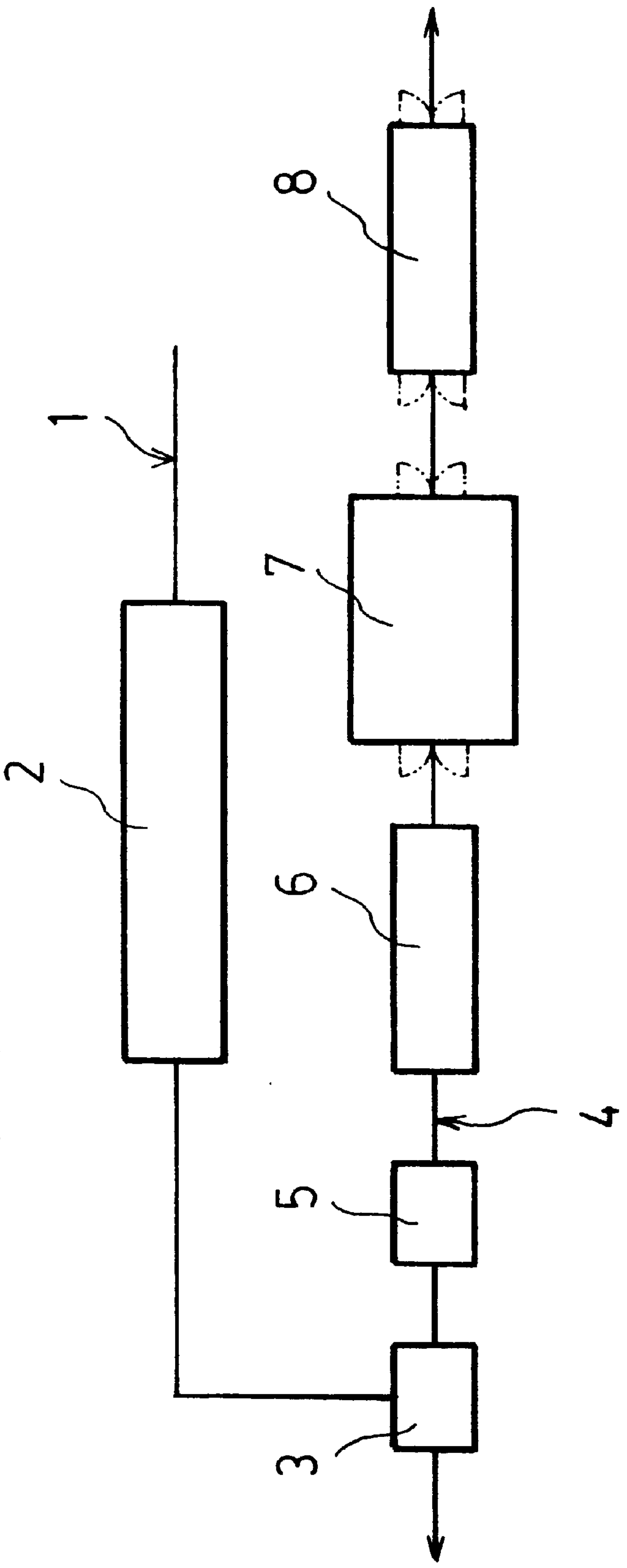
FIG. 1 is a block diagram of a coating line system including a main coating line and a coating repairing line, according to a first embodiment of the present invention.

FIG. 1 shows in block form a coating line system including a main coating line and a coating repairing line, according to a first embodiment of the present invention. The coating line system shown in FIG. 1 is typically incorporated in a coating line for coating automobile bumpers, for example. The coating repairing line is capable of efficiently repairing coating defects on automobile bumpers which have been discovered in the main coating line.

Figure 2:
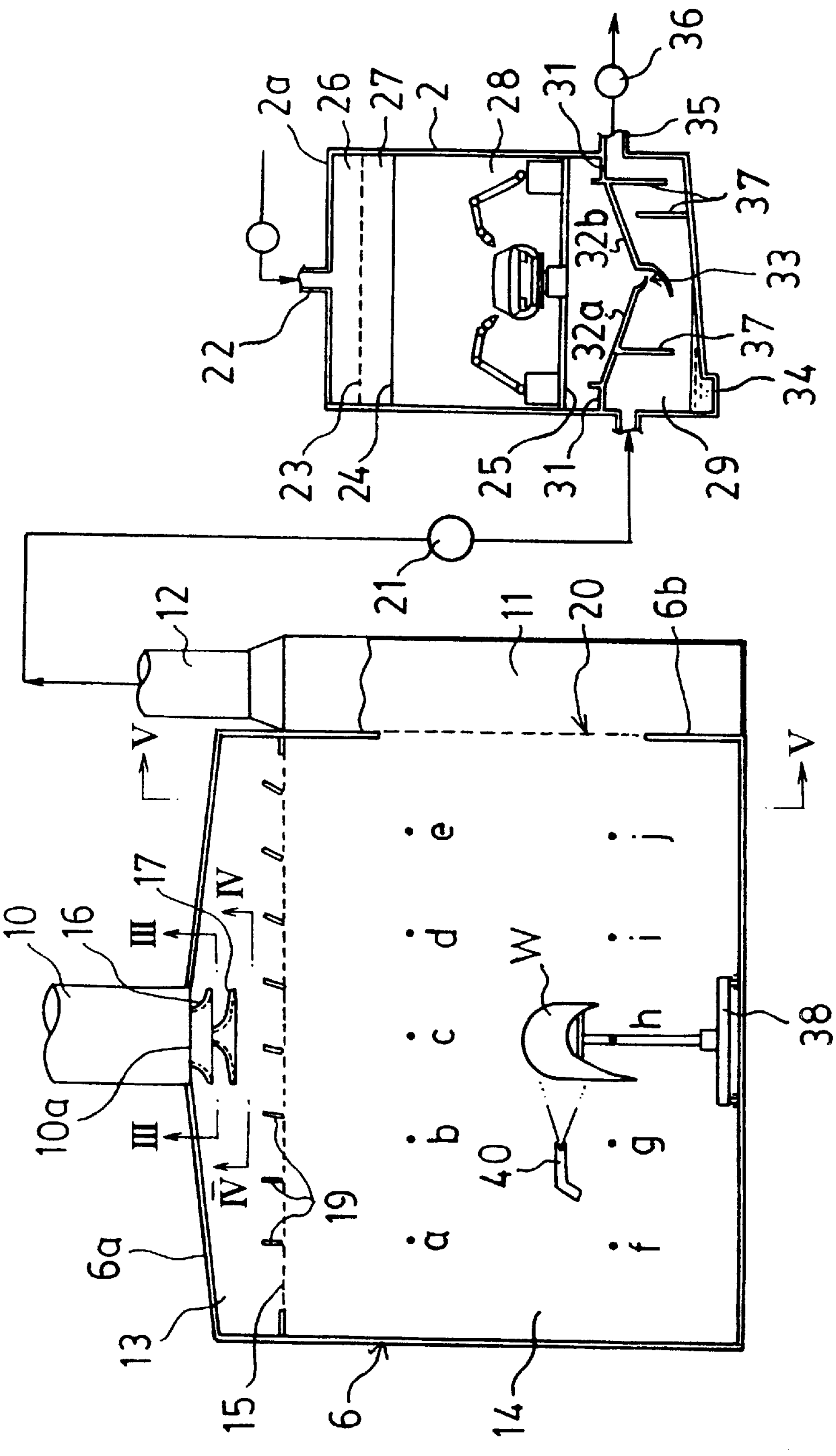
FIG. 2 is a vertical cross-sectional view of a coating repairing booth in the coating repairing line and a coating booth in the main coating line.
Figure 3:
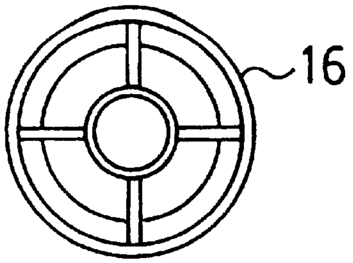
FIG. 3 is a bottom view taken along line III—III of FIG. 2.

As shown in FIG. 1, a main coating line 1 has a main coating booth 2 for coating a bumper W (see FIG. 2). The bumper W which is coated in the main coating booth 2 is supplied to a drying furnace (not shown) in which it is baked and dried. Thereafter, the coated bumper W is inspected for its coated condition by an inspecting section 3 (inspecting step). If the coated bumper W is free of coating defects, then the coating bumper w is discharged as a completed product leftward from the inspecting section 3. If the coated bumper W suffers a coating defect, then the coated bumper W is transferred rightward to a coating repairing line 4 connected to the inspecting section 3.

The coating repairing line 4 is branched from the main coating line 1 at the inspecting section 3, and has a grinding section 5, a coating repairing booth 6, a storage booth 7, and a drying furnace 8 which are arranged in the order named downstream along the coating repairing line 4. After the coating layer in a coating defect area of a bumper W is removed from the bumper W in the grinding section 5, the ground area of the bumper W is recoated in the coating repairing booth 6. When the number of repaired bumpers W stored in the storage booth 7 reaches a predetermined number, the repaired bumpers W are delivered into the drying furnace 8 in which the coating layers of the repaired bumpers W are dried.

Figure 4:
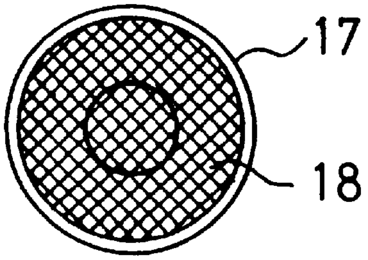
FIG. 4 is a bottom view taken along line IV—IV of FIG. 2.
Figure 5:
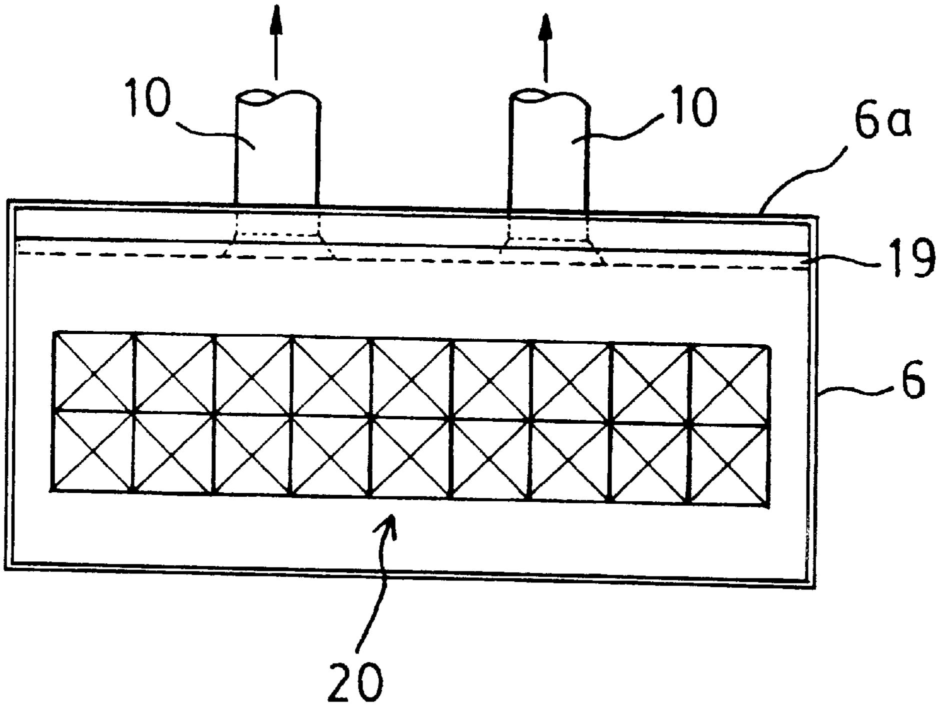
FIG. 5 is a cross-sectional view taken along line V—V of FIG. 2.

As shown in FIGS. 2 through 5, the coating repairing booth 6 has an upper wall 6*a* having an opening defined therein to which a plurality of (two in the illustrated embodiment, see FIG. 5) air inlet ducts 10 are connected for introducing air into the coating repairing booth 6 through the opening. An air discharge chamber 11 is connected to a vertical side wall 6*b* of the coating repairing booth 6 laterally of a workpiece feed path in the coating repairing booth 6. An air discharge duct 12 is connected to an upper end of the air discharge chamber 11. The coating repairing booth 6 has its interior space divided into an upper air direction adjusting chamber 13 and a lower coating chamber 14 by a horizontal filter 15. The air inlet ducts 10 have respective open ends 10a opening into the upper air direction adjusting chamber 13 and each connected to a plurality of (two in the illustrated embodiment, see FIG. 2) funnel-shaped air direction adjusting members 16, 17 which are disposed in the upper air direction adjusting chamber 13. As shown in FIG. 4, a punched metal sheet 18 is attached to a lower surface of the air direction adjusting member 17 which is positioned below the air direction adjusting member 16. The funnel-shaped air direction adjusting members 16, 17 serve to distribute or diffuse air supplied from the air inlet ducts 10 uniformly into the coating repairing booth 6. The side wall 6*b* of the coating repairing booth 6 has an air discharge port 20 defined therein through which the coating chamber 14 and the air discharge chamber 11 communicate with each other.

A plurality of air direction adjusting slats 19 are disposed on an upper surface of the filter 15. The air direction adjusting slats 19 extend along the workpiece feed path in the longitudinal direction of the coating repairing booth 6, i.e., in the direction normal to the sheet of FIG. 2. The air direction adjusting slats 19 are slanted such that the air direction adjusting slat 19 farthest from the air discharge chamber 11 is directed substantially vertically and the other air direction adjusting slats 19 have their upper ends inclined through progressively greater angles toward the air discharge chamber 11. Specifically, the air direction adjusting slats 19 extend parallel to the workpiece feed path in the coating repairing booth 6. The air direction adjusting slat 19 fartest from the air discharge port 20 is directed substantially vertically, and the upper ends of the other air direction adjusting slats 19 are slanted through progressively greater angles toward the air discharge port 20 to cause those air direction adjusting slats 19 which are positioned closer to the air discharge port 20 to direct air streams farther away from the air discharge port 20.

The air discharge duct 12 is connected through an air discharge fan 21 to a trapping chamber 29 defined in the main coating booth 2. The main coating booth 2 has an upper wall 2*a* to which an air supply duct 22 is connected. The main coating booth 2 houses therein a punched metal sheet 23, a filter 24, and a drainboard 25 which are arranged at spaced intervals in the order named in the downward direction. The punched metal sheet 23, the filter 24, and the drainboard 25 divide the interior space of the main coating booth 2 into a dynamic pressure chamber 26, a static pressure chamber 27, a coating chamber 28, and the trapping chamber 29 that are arranged downwardly in the order named.

The trapping chamber 29 has a pair of laterally spaced trapping water reservoirs 31 extending longitudinally along opposite side walls thereof, and a pair of water guide panels 32*a*, 32*b* extending from the trapping water reservoirs 31 obliquely downwardly toward each other. The water guide panels 32*a*, 32*b* have inner distal ends vertically superposed with a gap defined as a water passage 33 therebetween substantially centrally in the trapping chamber 29. The main coating booth 2 has a lower wall inclined transversely which includes a water drain bit 34 defined in the lower end of the lower wall near one vertical side wall of the main coating booth 2. The main coating booth 2 has an opposite vertical side wall to which there is connected an air discharge duct 35 connected to an air discharge fan 36. A vertical baffle plate 37 is connected to and extends downwardly from the water guide panel 32*a*, and a vertical baffle plate 37 is connected to and extends downwardly from the water guide panel 32*b*. Another vertical baffle plate 37 is connected to and extends upwardly from the lower wall of the main coating booth 2 adjacent to the vertical baffle plate 37 connected to the water guide panel 32*b*.

The coating repairing booth 6 is much simpler in structure than the main coating booth 2. However, the coating repairing booth 6 provides good coating conditions. Specifically, when air was supplied from the air inlet ducts 10 into the coating repairing booth 6 at a rate of 140 $m^3$/min. and discharged from the coating repairing booth 6 by the air discharge fan 21 at a rate of 140 $m^3$/min., the air flew at points “a”~“j” (see FIG. 2) in the coating repairing booth 6 at respective speeds of 0.40 m/sec. at the point “a”, 0.45 m/sec. at the point “b”, 0.45 m/sec. at the point “c”, 0.40 m/sec. at the point “d”, 0.40 m/sec. at the point “e”, 0.40 m/sec. at the point “f”, 0.40 m/sec. at the point “g”, 0.40 m/sec. at the point “h”, 0.40 m/sec. at the point “i”, and 0.40 m/sec. at the point “j” as measured by an anemometer Model 6151, and it was found that the air speeds were appropriate in the range from 0.40 m/sec. to 0.45 m/sec.

The bumper W is placed on a repairing carriage 38 which can travel along the workpiece feed path in the coating repairing booth 6, and is coated by a coating gun 40. A mist of coating solution suspended in the coating repairing booth 6 is collected by the air flowing in the coating repairing booth 6, and delivered into the air discharge chamber 11, from which the coating solution mist is discharged into the trapping chamber 29 in the main coating booth 2 by the air discharge fan 21. Therefore, no trapping chamber is needed in the coating repairing booth 6, which may thus be relatively simple in structure and small in size.

Figure 6:
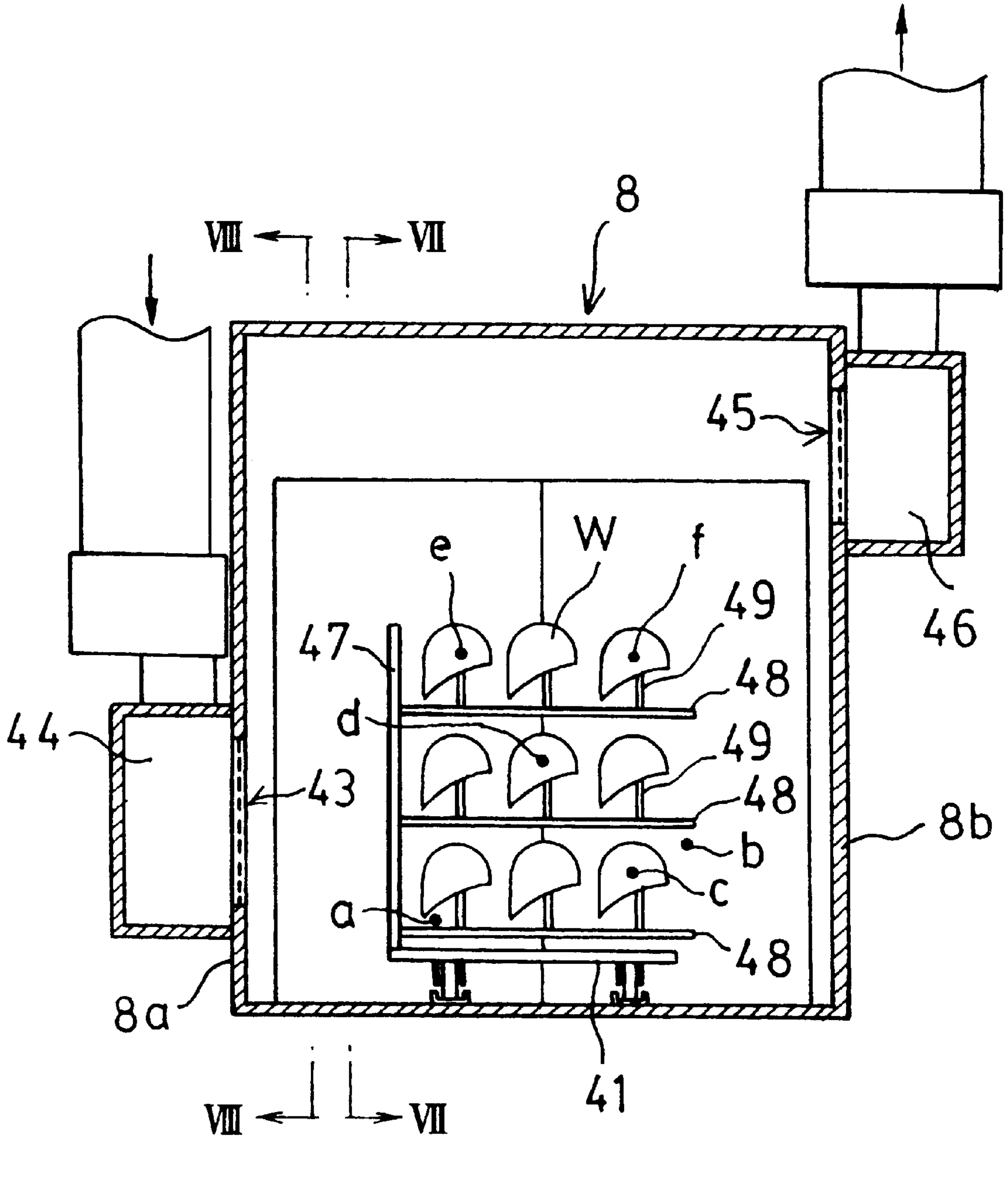
FIG. 6 is a transverse cross-sectional view of a drying furnace in the coating repairing line, the view being taken across a workpiece conveyor in the drying furnace.
Figure 7:
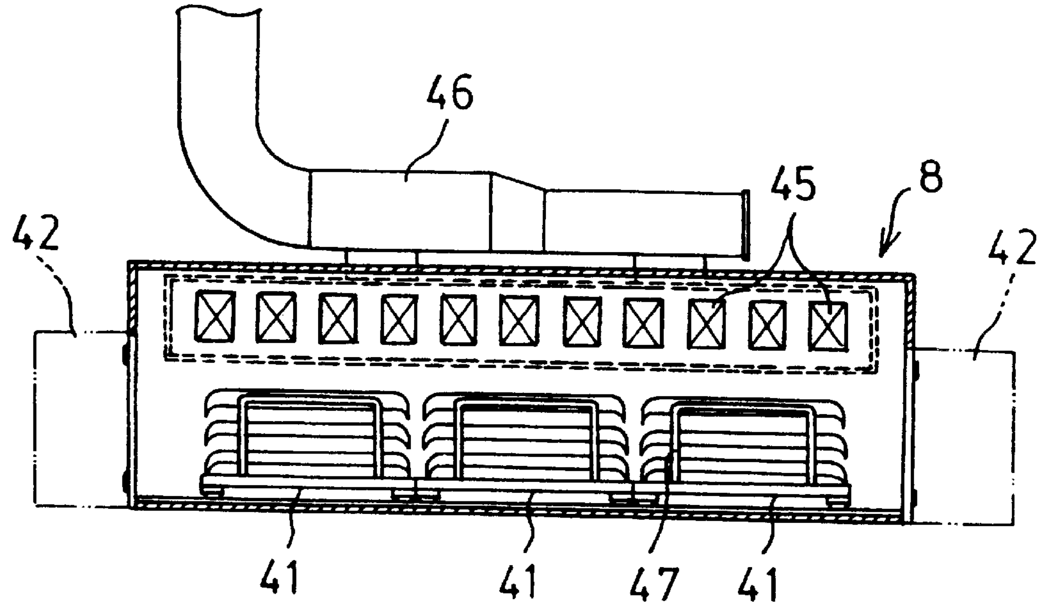
FIG. 7 is a cross-sectional view taken along line VII—VII of FIG. 6.
Figure 8:
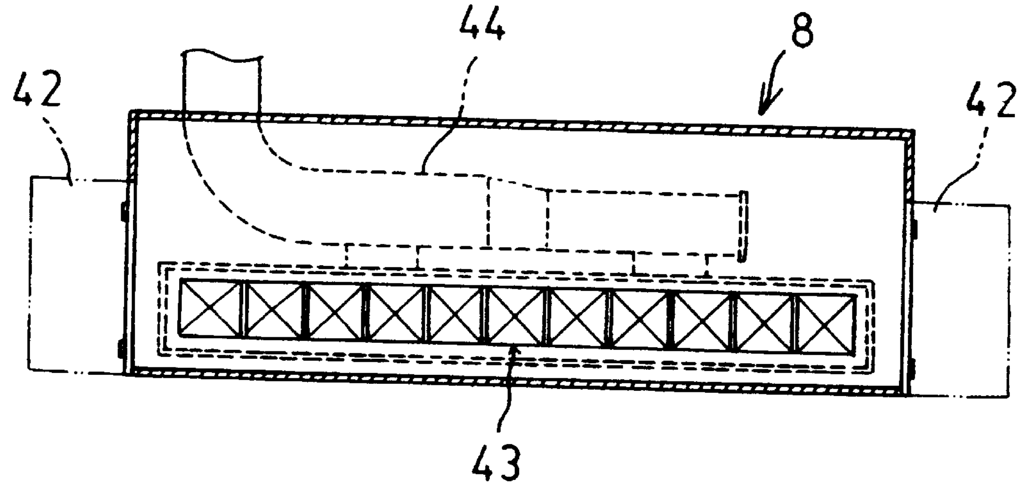
FIG. 8 is a cross-sectional view taken along line VIII—VIII of FIG. 6.

The drying furnace 8 will be described below with reference to FIGS. 6 through 8. As shown in FIG. 6, the drying furnace 8 comprises a batch drying furnace for drying a batch of coated bumpers w carried on a drying carriage 41 which travels along a carriage path in the drying furnace 8. As shown in FIGS. 7 and 8, the drying furnace 8 has a pair of double-leafed hinged doors 42 at inlet and outlet openings thereof through which the drying carriage 41 can move into and out of the drying furnace 8. As shown in FIG. 6, the drying furnace 8 has a hot air supply port 43 defined in a lower portion of a vertical side wall 8*a* thereof which extends along the carriage path, the hot air port 43 being connected to a hot air supply duct 44. The drying furnace 8 has a plurality of longitudinally spaced hot air discharge ports 45 defined in an upper portion of an opposite vertical side wall 8*b* thereof and connected to respective hot air discharge ducts 46 that are joined to an outer surface of the vertical side wall 8*b*.

The drying carriage 41 comprises a vertical side frame 47, a pair of front and rear sets of three vertically spaced horizontal support bars 48 extending laterally from the vertical side frame 47, and three workpiece support rods 49 supported vertically on each of the horizontal support bars 48. Each of the bumpers W is supported by a pair of front and rear workpiece support rods 49. Therefore, a total of nine bumpers W can be carried by one drying carriage 41. The drying furnace 8 can accommodate three drying carriages 41 at a time.

For drying coated surfaces of the bumpers W within a short period of time in the drying furnace 8, it is preferable to quickly achieve a desired temperature in the drying furnace 8 after hot air has started to be supplied into the drying furnace 8 and thereafter keep the desired temperature stable in the drying furnace 8.

A test was conducted by placing three drying carriages 41 in the drying furnace 8, closing the double-leafed hinged doors 42, supplying hot air at 85° C. from the hot air supply port 43 into the drying furnace 8, and observing temperatures in the drying furnace 8. The temperatures measured at respective points "a"~"f" (see FIG. 6) in the drying furnace 8, as they varied with time, are plotted in FIG. 9. A study of FIG. 9 indicates that the temperatures measured at the points "a" and "b" in the drying furnace 8 reached 85° C. in about 25 minutes and were constant subsequently, and the temperatures measured at the points "c"~"f" on surfaces of bumpers W reached 80° C. in about 25 minutes and were constant subsequently.

Figure 9:
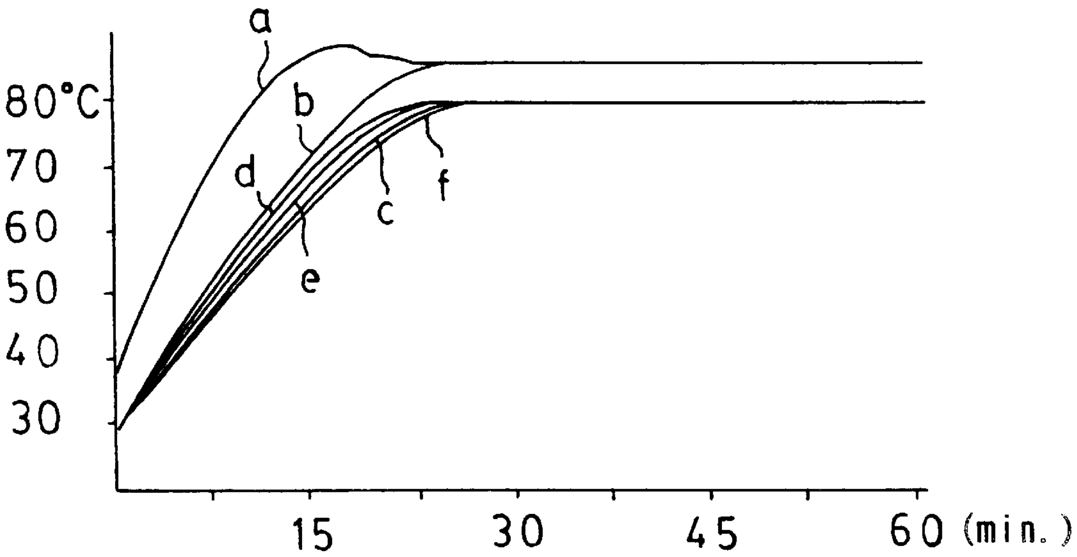
FIG. 9 is a graph of temperatures at different points in the drying furnace as they increase with time.

It can be seen from FIG. 9 that the temperatures in the drying furnace 8 can rise quickly and can subsequently be kept at constant levels. When bumpers W carried on the three drying carriages 41 were dried in the drying furnace 8, the coated surfaces of the bumpers W were uniformly dried in about 55 minutes after they began to be dried. Therefore, items or parameters to be controlled in the drying furnace 8 may be only the temperature of the hot air and the time for which the hot air is supplied. The drying furnace 8 itself is quite simple in structure.

When a bumper W coated in the coating repairing booth 6 is delivered into the storage booth 7 by the repairing carriage 38, the bumper W is transferred onto the drying carriage 41 and stored in the storage booth 7. When the number of stored bumpers W in the storage booth 7 reaches a predetermined number, the bumpers W are then delivered into the drying furnace 8 by the drying carriage 41. In this manner, the bumpers W can be dried with high energy efficiency in the drying furnace 8.

Any bumper W which has been coated in the main coating booth 2 in the main coating line 1 is inspected in the inspecting section 3. If the coating layer of the bumper W is found normal, then it is discharged as a completed product leftward from the inspecting section 3. If the coated bumper W suffers a coating defect, then it is transferred rightward to the coating repairing line 4 in which the coating layer around the coating defect of the bumper W is removed in the grinding section 5 and then the bumper W is delivered into the coating repairing booth 6 in which it is locally recoated.

Though no dynamic and static pressure chambers are defined in the coating repairing booth 6, air flows at appropriate rates and speeds in the coating chamber 14, allowing the bumper W to be coated under stable conditions. Since a collected mist of coating solution is discharged into the trapping chamber 29 in the main coating booth 6, no dedicated trapping chamber is required in the coating repairing booth 6, and hence the coating repairing booth 6 may be small in size and simple in structure.

A bumper W whose defective coating layer has been repaired is placed on the repairing carriage 38 and carried into the storage booth 7 where the bumper W is transferred onto a drying carriage 41. The bumper W remains stored in the storage booth 7 until a predetermined number of bumpers W are accumulated in the storage booth 7. When the number of stored bumpers W in the storage booth 7 reaches a predetermined number, the bumpers W are delivered altogether to the drying furnace 8. The drying furnace 8 is then supplied with hot air for a certain period of time, after which the bumpers W are unloaded from the drying furnace 8. In this manner, bumpers W with defective coating layers can efficiently be repaired in the dedicated coating repairing line 4.

As described above, when a workpiece with a coating defect is discovered in the inspecting step of the main coating line of the coating line system according to the first embodiment, the workpiece is delivered into the coating repairing booth of the coating repairing line, locally recoated in the coating repairing booth, and then delivered to the drying furnace in which the workpiece is dried. Therefore, workpieces with normal and defective coating layers are not simultaneously present in the main coating booth of the main coating line, and any workpieces with coating defects can efficiently be repaired smoothly.

The air discharge chamber is connected to one of the vertical side walls of the coating repairing booth laterally of the workpiece feed path in the coating repairing booth, and is held in communication with the trapping chamber in the main coating booth of the main coating line. Since the trapping chamber in the main coating booth is shared by the main coating booth and the coating repairing booth, the coating repairing booth requires no dedicated trapping chamber therein and hence is relatively simple in structure.

The hot air supply duct is connected to the lower portion of one of the side walls of the drying furnace, and the hot air discharge ducts are connected to the upper portion of the other side wall of the drying furnace. With this arrangement, the temperature in the drying furnace can be increased in a relatively short period of time, and subsequently maintained at a constant temperature. The drying furnace is also relatively simple in structure.

The coating repairing booth has the air direction adjusting members connected to the respective open ends of the air inlet ducts joined to the upper wall of the coating repairing booth. The interior space of the coating repairing booth is divided into the upper air direction adjusting chamber and the lower coating chamber by the horizontal filter. The air direction adjusting slats are attached to the upper surface of the filter, and the air discharge duct is connected to one side wall of the lower coating chamber. With this arrangement, the speed of air flowing in the lower coating chamber can be kept at a constant level though no dynamic and static pressure chambers are defined in the coating repairing booth. The coating repairing booth is thus relatively simple in structure.

A coating line system for repairing a coating defect of a bumper which is caused in a main coating line, according to a second embodiment of the present invention will be described below. According to the second embodiment, the main coating line differs from the main coating line according to the first embodiment.

Figure 12:
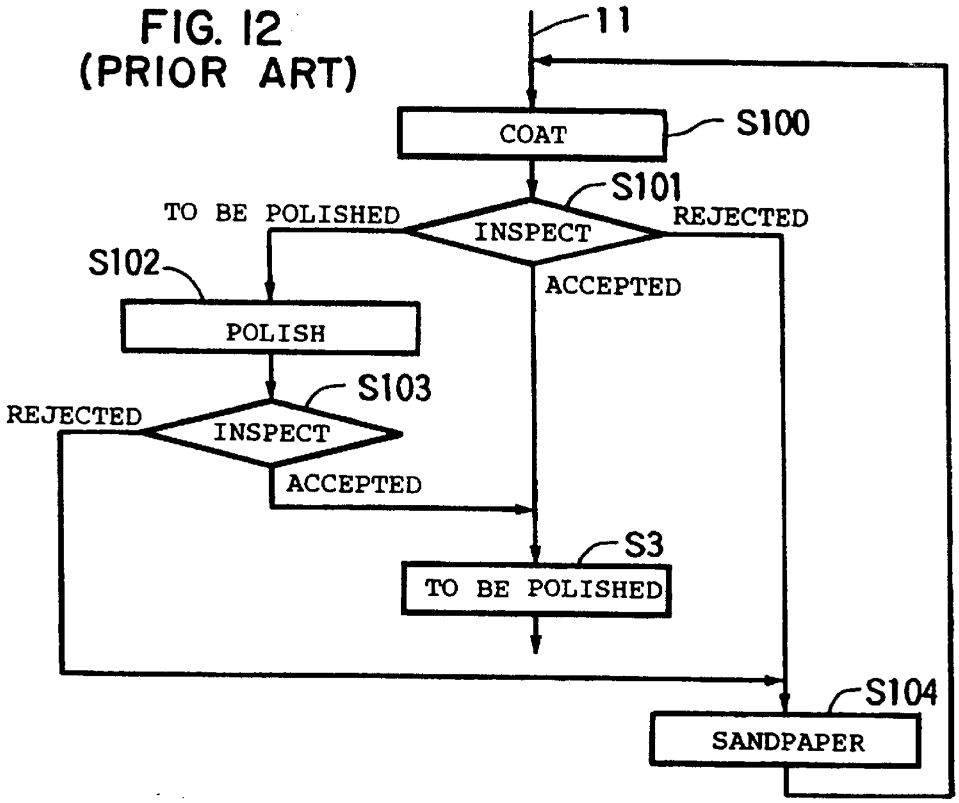
FIG. 12 (PRIOR ART)
FIG. 12 is a flowchart of an operation sequence of a conventional bumper repairing process.

FIG. 12 shows an operation sequence of a conventional bumper repairing process. As shown in FIG. 12, a bumper is coated in a coating section S100 (coating step) of a main coating line 11, and then inspected in an inspecting section S101 (inspecting step). If the inspected bumper needs to be polished, then it is polished in a polishing section S102 (polishing step), and thereafter inspected in an inspecting section S103 (inspecting step). If the inspected bumper is rejected in the inspecting section S101, then it is sent to a sandpaper rubbing section S104 (sandpaper rubbing step) in which the bumper is sandpapered in its entirety, but not just a defective coating layer thereof. Thereafter, the bumper is recoated in its entirety in the coating section S100 of the main coating line.

With the conventional bumper repairing process shown in FIG. 12, since even those portions of bumpers which do not need to be coated again are recoated, the entire repairing process is tedious and time-consuming, and consumes a large amount of coating solution. Moreover, inasmuch as bumpers with defective coatings are repaired in the coating section S100 of the main coating line 11, the productivity of the coating process is comparatively low.

The coating line system according to the second embodiment has been revised in an attempt to eliminate the above drawbacks of the conventional bumper repairing process. The coating line system according to the second embodiment is relatively simple in structure and capable of easily and efficiently repairing coating defects on coated bumpers while saving resources and energy.

Figure 10:
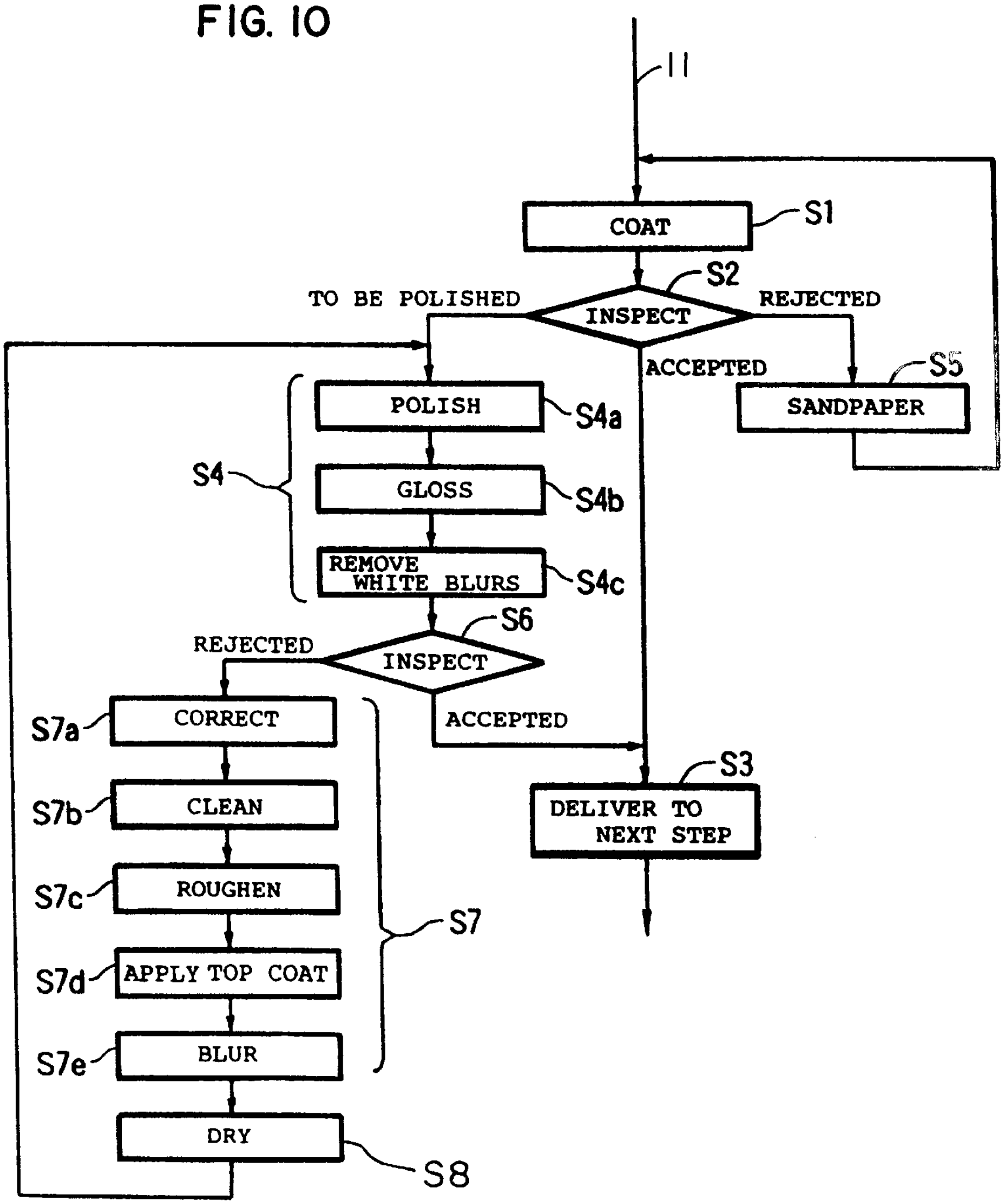
FIG. 10 is a flowchart of a bumper repairing process in a coating line system according to a second embodiment of the present invention.

A bumper repairing process of the coating line system according to the second embodiment is illustrated in FIG. 10.

As shown in FIG. 10, a bumper W is coated in a coating section S1 (coating step) of a main coating line 11. Specifically, in the coating section S1, the bumper W is treated with a chlorine solvent, coated with a primer, coated with a top coat of enamel and clear lacquer, and dried with circulating hot air. After the bumper W is coated, its coating layer is inspected in an inspecting section S2 (inspecting step). If the bumper W is accepted, then it is delivered to a next section S3 (next step) of the main coating line 11. If the bumper W needs to be polished, then it is sent to a polishing section S4 (polishing steps S4*a*, S4*b*, S4*c*) where it is polished. If the bumper W is rejected, i.e., if the bumper W has a large defective coating area greater than a postcard and cannot be repaired in a spot thereon, then it is delivered to a sandpaper rubbing section S5 (sandpaper rubbing step) in which the bumper is sandpapered. Thereafter, the bumper W is recoated in the coating section Si (coating step) of the main coating line 11.

In the polishing section S4, the bumper W is ground with sandpaper and polished with a very fine compound in the step S4*a*, glossed with a compound in the step S4*b*, and treated with a wax to remove white blurs from the bumper W in the step S4*c*.

After the bumper W is polished in the polishing section S4, it is inspected in a second inspecting section S6 (inspecting step). If the bumper W is accepted, it is delivered to the next section S3 (next step) of the main coating line 11. If the bumper W is rejected, then it is coated in a spot thereon in a spot coating section S7 (spot coating steps S7*a*~S7*e*) and dried in a drying section S8 (drying step).

In the spot coating section S7, the bumper W is successively corrected in its polished condition with sandpaper in the step S7*a*, cleaned with a white damp in the step S7*b*, roughened with uniwool, sandpaper, or a compound in the step S7*c*, coated with a top coat of enamel and clear lacquer in the step S7*d*, and blurred with a blurring solution in the step S7*e*. Thereafter, the bumper W is dried with circulating hot air in a drying section S8.

In the roughening step S7*c*, the bumper W is roughened with a selected one of uniwool, sandpaper, and a compound. In the top coating step S7*d*, the bumper W is coated using the same coating solution, composed of a paint, a hardener, and a thinner, as the coating solution used in the coating section S1 of the main coating line 11. The blurring solution used in the blurring step S7*e* comprises 2% by weight of a hardener, 8% by weight of a clear lacquer, 10~45% by weight of a thinner, and 45%~80% by weight of a retarder. The thinner may be a thinner for Soflex clear lacquer, for example, manufactured by Kansai Paint Co., Ltd. and the retarder may be a Hiart # 3000 retarder, for example, manufactured by Isamu Paint Co., Ltd. If the amount of the retarder were less than 45% by weight, then the bumper surface would become less smooth and suffer blurring marks, requiring the bumper W to be processed in longer time and with greater efforts in the step S4*a*. If the amount of the retarder were more than 80% by weight, then the blurring solution would not adhere closely to the top coat on the bumper W.

Figure 11:
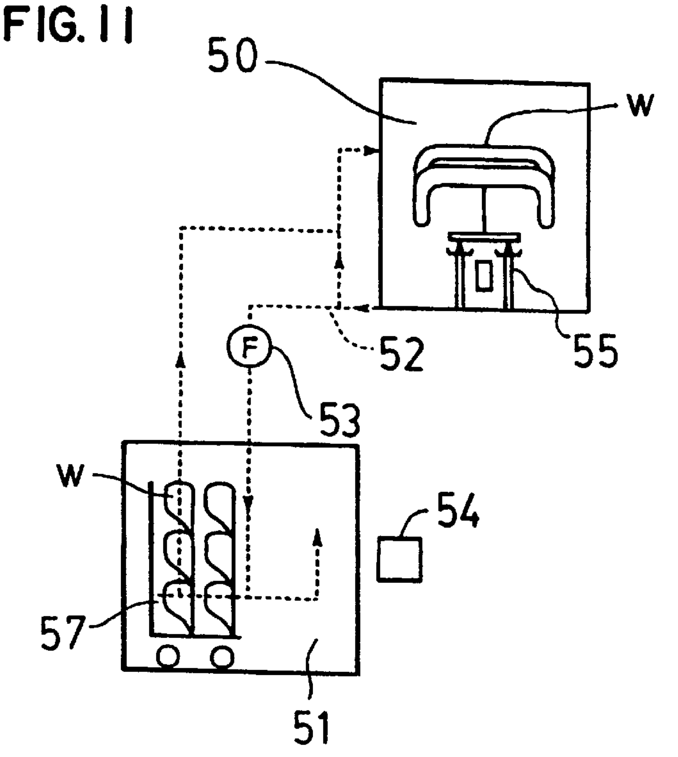
FIG. 11 is a schematic view showing the relationship between a spot drying furnace and a main line drying furnace in the coating line system according to the second embodiment.

As shown in FIG. 11, the drying section S8 has a spot drying furnace 51 for drying bumpers W with circulating hot air at 80° C. for 30 minutes which is supplied from a main line drying furnace 50 which is disposed in the coating section S1 of the main coating line 11. The spot drying furnace 51 is connected to the main line drying furnace 50 through a circulating duct 52 having an air fan 53 disposed near an inlet port of the spot drying furnace 51. The spot drying furnace 51 is controlled through a control console 54.

The bumpers W which are carried on a carriage 55 are dried with circulating hot air at 80° C. for 30 minutes in the main line drying furnace 50 while the bumpers W are being fed in the main line drying furnace 50 by the carriage 55. If no hot air needs to be introduced from the main line drying furnace 50 into the spot drying furnace 51, then the air fan 53 is not actuated, and the hot air circulates only in the main line drying furnace 50.

For drying a predetermined number of bumpers W coated in the spot coating section S7 with the spot drying furnace 51, the bumpers W are carried on the carriage 57 and delivered into the spot drying furnace 51, and the air fan 53 is actuated to introduce hot air from the main line drying furnace 50 into the spot drying furnace 51 through the circulating duct 52. At the same time, the hot air is circulated between the main line drying furnace 50 and the spot drying furnace 51 in order to be kept at 80° C. at all times. In this manner, the bumpers w can be dried also in the spot drying furnace 51 with circulating air at 80° C. for 30 minutes.

Each of the dried bumpers W is polished again in the polishing section S4 (polishing steps S4*a*, S4*b*, S4*c*). After the bumper W is polished in the polishing section S4, it is inspected again in the inspecting section S6. If the inspected bumper W is accepted, then it is delivered to the next section S3 of the main coating line 11. If the inspected bumper W is rejected, it is recoated in a spot thereon in the spot coating section S7 and then dried in the drying section S8.

The coating line system according to the second embodiment is effective to reduce the amount of a coating solution which is consumed and hence to save resources required to coat bumpers W. Since polished bumpers W which are rejected can be repaired without using the coating section S1 of the main coating line, the productivity of the main coating line can be increased. Furthermore, polished bumpers W are dried with heat supplied from the main line drying furnace, the running cost of the coating line system is relatively low, and the coating line system is effective to save energy required to coat bumpers W.

Although certain preferred embodiments of the present invention have been shown and described in detail, it should be understood that various changes and modifications may be made therein without departing from the scope of the appended claims.

What is claimed is:

1. A method of repairing a coating defect of a workpiece, comprising the steps of:

coating workpieces in a main coating line, drying nondefective workpieces in a main line drying furnace in said main coating line;

inspecting coated conditions of the workpieces after the workpieces are coated in said main coating line to determine whether each of the workpieces is a nondefective workpiece for being delivered to a next step in said main coating line, rejected as a defective workpiece, or is a workpiece in need of polishing;

delivering the defective workpiece from said main coating line to a coating repairing line branched from said main coating line if the defective workpiece coated in the main coating line has a coating defect;

repairing the coating defect of the defective workpiece in said coating repairing line, said repairing step including recoating the coating defect on the defective workpiece, said recoating step including the steps of successively correcting a polished condition of the defective workpiece, cleaning the defective workpiece, roughening the defective workpiece, coating the defective workpiece with a top coat, and blurring the defective workpiece, wherein to obtain a recoated workpiece;

moving said recoated workpiece to a spot drying furnace; and circulating hot air to dry the recoated workpiece from said main line drying furnace to said spot drying furnace through a circulating duct having therein an air fan.

2. A coating line system comprising:

a main coating line including at least a main coating booth for coating workpieces; and a coating repairing line branched from said main coating line;

said coating repairing line having:

coating repairing means for repairing a coating defect of a defective workpiece which is caused in said main coating line, said coating repairing means having a coating repairing booth for recoating a localized coating defect surface of the defective workpiece with a mist of coating solution, said coating repairing booth having a workpiece feed path for delivering the defective workpiece therealong, said coating repairing booth also having a side wall and an air discharge chamber connected to said side wall laterally of said workpiece feed path, said coating line system further having an air discharge duct with an air discharge fan therein, said main coating booth having a trapping chamber, said air discharge chamber communicating with said trapping chamber through said air discharge duct with said air discharge fan therein so as to process said mist of coating solution; and drying means disposed downstream of said coating repairing means along said coating repairing line, for drying the workpiece which has been repaired by said coating repairing means.

3. A coating line system comprising:

a main coating line including at least a main coating booth for coating workpieces, said main coating line further including a first inspecting section for inspecting a coated condition of the workpieces after the workpieces are coated in said main coating booth to determine whether each of the workpieces is accepted as a nondefective workpiece for being delivered to a next step in said main coating line, rejected as a defective workpiece, or is a workpiece in need of polishing, said main coating line also including a polishing section for polishing the workpiece in need of polishing, said polishing section including means for successively polishing the workpiece, glossing the workpiece, and removing white blurs from the workpiece, said main coating line still further including a second inspecting section for inspecting a polished condition of the workpiece from said polishing section to determine whether the workpiece is accepted for being delivered to the next step or rejected, said main coating line yet further including a main line drying furnace for drying the nondefective workpiece;

a coating repairing line branched from said main coating line;

said coating repairing line having:

a coating repairing means for repairing a coating defect of said defective workpiece which is caused in said main coating line, said coating repairing means including a spot coating section for recoating a coating defect spot on the defective workpiece to obtain a recoated workpiece; and drying means disposed downstream of said coating repairing means, for drying the recoated workpiece which has been repaired by said coating repairing means, said drying means including a spot drying furnace communicating with said main line drying furnace through a circulating duct having therein an air fan thereby drying the recoated workpiece with heat supplied from said main line drying furnace.

* * * * *